W. McINTURF.
TIRE UPSETTER.

No. 179,663. Patented July 11, 1876.

Witnesses:
P. C. Dieterich.
Wm. B. Upperman.

Inventor:
Wm. McInturf
per: C. H. Watson & Co. Attorneys.

UNITED STATES PATENT OFFICE.

WILLIAM McINTURF, OF ALANTHUS, MISSOURI.

IMPROVEMENT IN TIRE-UPSETTERS.

Specification forming part of Letters Patent No. 179,663, dated July 11, 1876; application filed May 13, 1876.

*To all whom it may concern:*

Be it known that I, WILLIAM MCINTURF, of Alanthus, in the county of Gentry and State of Missouri, have invented certain new and useful Improvements in Tire-Upsetter; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a machine for upsetting or shrinking tires, as will be hereinafter more fully set forth.

Figure 1:
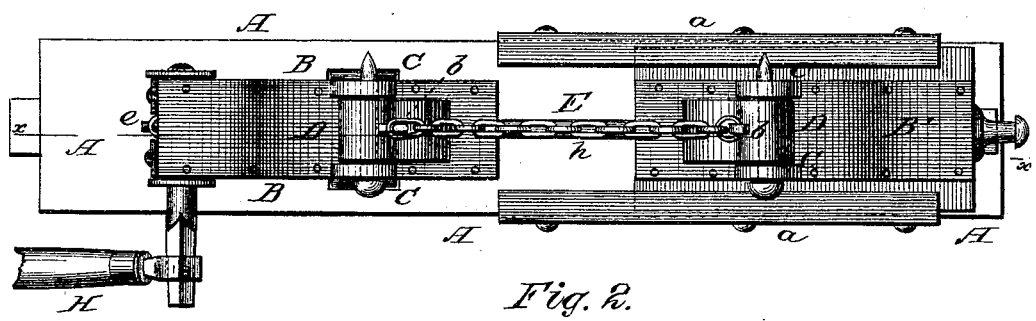
Figure 2:
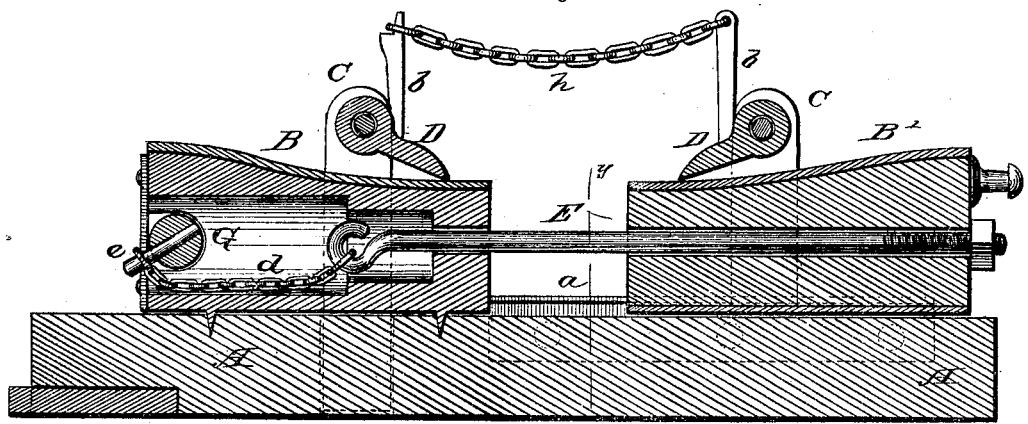
Figure 3:
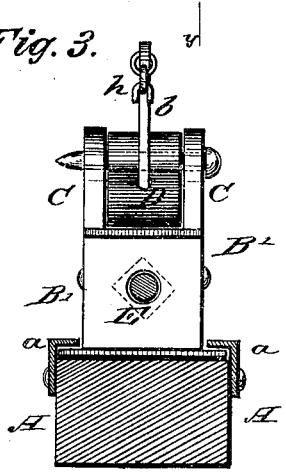

In the annexed drawing, Figure 1 is a plan view. Fig. 2 is a central vertical section on the line $x\,x$, Fig. 1; and Fig. 3 is a transverse section on line $y\,y$, Fig. 2.

A represents the bed of my machine, on which is one stationary block, B, and one movable block, B'. The upper surfaces of these blocks are made inclined or slightly concave from the outer to the inner ends. The movable block B' is held and guided in its movement by guides $a\,a$ on the bed A. Each block has two side standards, C, between the upper ends of which is hung a dog, D, and from the upper portion of said dog projects an arm or lever, $b$, as shown. If the blocks B B' are made of wood, their top surfaces should be lined with metal, as represented in the drawing; but probably I shall prefer to make the blocks of cast-iron. The points of the dogs D D are to be faced with steel. In the movable block B' is secured a horizontal rod, E, which extends out through the inner end thereof, and into the stationary block B. Within this block the end of the rod E is, by a short chain, $d$, connected with a hook, $e$, on a roller or windlass, G, placed in the outer or rear end of said block, and having its journal-bearings in the sides thereof. One of the journals of the roller G is extended through the block, and has a lever, H, secured thereon. The arms or levers $b\,b$ of the two dogs D D are connected by a chain, $h$.

In putting the tire on the shrinker, one end of the chain $h$ will have to be unhooked; and when the tire is placed in position the chain is hooked on, and the operator then steps on said chain with one foot, and draws on the lever till the dogs or latches are thoroughly caught on the tire. Then the chain $h$ is thrown off with the foot, and the operator will then use hammer with one hand, while he shrinks the tire with the other hand.

This machine is simple, and yet durable and not liable to get out of order. It can be operated by almost any one.

Having thus fully described my invention, what I claim as new, and desire to secure by Letters Patent, is—

1. The combination of the movable block B', rod E, stationary block B, chain $d$, and roller G, with hook $e$, and lever H, all as and for the purposes herein set forth.

2. In a tire-upsetter, the pivoted latches D D, having arms $b\,b$, and directly connected with chain $h$, in combination with movable block B', roller G, hook $e$, chain $d$, lever H, rod E, and stationary block B, all constructed and arranged substantially as and for the purpose set forth.

In testimony that I claim the foregoing as my own I affix my signature in presence of two witnesses.

WILLIAM MCINTURF.

Witnesses:
CHAS. D. BLODGETT,
ALLEN WILLIAMS.